United States Patent [19]
Taylor, Jr.

[11] Patent Number: 5,288,674
[45] Date of Patent: Feb. 22, 1994

[54] CATALYTIC DEVICE FOR TREATMENT OF COMBUSTION GASES AND ITS METHOD OF USE, AND THE CATALYTIC MATERIAL USED IN THE CATALYTIC DEVICE

[76] Inventor: Jack H. Taylor, Jr., 6250 Valley Wood Dr., Reno, Nev. 89523

[21] Appl. No.: 783,877

[22] Filed: Oct. 29, 1991

[51] Int. Cl.⁵ .......................... B01J 21/14; B01J 29/06
[52] U.S. Cl. ...................................... 502/63; 502/80; 502/243
[58] Field of Search .......................... 502/63, 80, 243; 423/213.2

[56] References Cited

U.S. PATENT DOCUMENTS 2,488,530  11/1949  Friedman et al. .................. 502/243

FOREIGN PATENT DOCUMENTS 1-128946  5/1989  Japan .................................. 502/243
4-007034  1/1992  Japan ................................ 423/213.2

*Primary Examiner*—Carl F. Dees
*Attorney, Agent, or Firm*—Sughrue, Mion, Zinn, Macpeak & Seas

[57] ABSTRACT

This invention relates to an emission control device containing a catalytic material capable of reducing pollutants in the combustion gases generated from an internal combustion engine, as well as from other combusted solid and liquid fossil fuels such as coal, and is also useful for treating combustion gases generated from the incineration of landfill garbage and tire rubber, among others. The catalytic material of the present invention is highly resistant to deactivation or poisoning from contaminants in the combusted material such as leaded gasoline. The catalytic material predominantly comprises a plagioclase feldspar belonging mainly to the albite-anorthite series and contains small amounts of mica, kaolinite and serpentine, and optionally contains magnetite.

8 Claims, 1 Drawing Sheet

CATALYTIC DEVICE FOR TREATMENT OF COMBUSTION GASES AND ITS METHOD OF USE, AND THE CATALYTIC MATERIAL USED IN THE CATALYTIC DEVICE

FIELD OF THE INVENTION

The invention relates to a catalytic device for treating combustion gas pollutants with use of a catalytic material derived from an unusual mineral formation of volcanic ash in either its native state or as preconditioned by magnetic separation. More particularly, the invention relates to a catalytic material suitable for a variety of applications including, but not limited to, (1) treatment of exhaust gases generated by combustion of fossil fuels, both liquid and solid, and wood materials; and (2) treatment of gases generated from incineration of tire rubber and landfill waste; and also (3) scrubbing of steam well gases. The catalytic material of the present invention displays a remarkable ability to reduce the proportion of exhaust gas pollutants such as hydrocarbons, carbon dioxide, carbon monoxide, sulfur dioxide, nitrogen oxides while increasing oxygen output and strongly resisting deactivation by catalytic poisons.

BACKGROUND OF THE INVENTION

It is well known that the combustion of fossil fuels, e.g., gasoline, generates deleterious automobile exhaust containing carbon monoxide, carbon dioxide, oxides of nitrogen (primarily $NO_x$), water, and nitrogen. The exhaust also can contain a wide variety of hydrocarbons and also particulates including carbon and oxidized carbon compounds, metal oxides, oil additives, fuel additives, and breakdown products of the exhaust system, including the exhaust-control catalysts.

These exhaust products can combine in a large variety of ways in the atmosphere, particularly since the amounts of each material change with operating conditions and the mechanical state of the vehicle. The photochemical reaction between oxides of nitrogen ($NO_x$) and hydrocarbons (HC) that caused the original interest in the automobile as a source of pollution has been investigated extensively.

Due to the now well-appreciated harmful effects of the vehicle emission pollutants to both health and to the environment in general, ever increasing stringent air quality standards are being imposed on emissions at both a federal and state level.

Also, many commercial operations, industrial is processes or even home heating systems generate noxious gaseous chemical by-products, the removal of which must comply with federal or state regulations. These regulations may be highly expensive to meet with, if not cost prohibitive, using current exhaust gas treatment technology. Therefore, the anticipated benefits of improved environmental quality confers a very high value on any new engineering technology that might be useful to meet the regulatory air quality standards.

A known technology for control of exhaust gas pollutants from both stationary and mobile sources is their catalyzed conversion into more innocuous chemical species. Conventional oxidation catalysts used in this regard promote further burning of hydrocarbons and carbon monoxide in the exhaust gas. The normal operating temperature is 480° to 650° C. Oxidation catalysts in current use normally start oxidizing within two minutes after the start of a cold engine and will operate only when the catalytic species is sufficiently heated to achieve an activation temperature.

Known oxidation catalysts consist of platinum and mixtures of platinum and other noble metals, notably s palladium. These metals are deposited on alumina of high surface area. The alumina ceramic material is typically capable of withstanding very high temperatures. The ceramic core has thousands of passages-about 240 per square inch. These passages present an enormous surface area for contact with the exhaust as it passes through the catalytic converter. The ceramic passages are coated with the platinum and palladium metals. These metals provide the catalysts.

When properly contained in the muffler-like shell of the catalytic converter, the catalysts will reduce hydrocarbon and carbon monoxide pollutants by changing them into more harmless products of water vapor and carbon dioxide. Another common form of oxidization catalyst involves a monolith in a honeycomb configuration to provide the necessary surface area and a top layer of the deposited catalytic metal species. The selection of one or the other above catalytic configurations is dictated by the kind of vehicle usage, as understood in the field.

However, conventional catalytic devices and catalytic species used therein have serious drawbacks in that they typically are susceptible to poisoning, i.e., deactivation resulting from chemical changes caused by the combined effects of thermal conditions and contamination as characterized by a chemical reaction of a contaminant with the supported catalysts. For instance, the most notorious poison for vehicular catalytic converters is the lead compound used as an anti-knocking agent. The poisoning of the catalysts by the contaminant, such as lead, is irreversible.

Moreover, many conventional catalysts also are susceptible to inhibition, or so-called reversible poisoning because of its temporary effect, due to exposure of the catalytic species to many common exhaust gas components such as carbon monoxide, nitrogen oxides or even some reduced sulfur compounds.

Compounding the poisoning problem encountered with many conventional catalysts used in treatment of exhaust gases is the demand for a more versatile catalytic species having applicability to diverse areas of exhaust gas treatment.

For instance, the federal and state regulatory attitude is ever increasingly stricter in imposing emission control standards covering a plethora of both commercial and private emission sources, e.g., coal burning plants and stoves, wood burning stoves, garbage incineration, used tire incineration, and not merely vehicle exhaust regulation.

Therefore, in an effort to meet current and perhaps even stricter future environmental air quality objectives, many public and private concerns have urgently awaited any possible innovations in the catalytic exhaust control field which might meet these standards.

SUMMARY OF THE INVENTION

One of the objects of the present invention is to provide an emission control device containing a catalytic material capable of reducing the level of harmful pollutants contained in exhaust gases generated by the combustion of fossil fuels, wood materials, rubber materials and the like.

It is another object of the present invention to provide a catalytic material which is not only capable of reducing the hydrocarbon, carbon monoxide and carbon dioxide emissions from burnt fossil fuels, but which also can reduce $NO_x$ emissions while concomitantly increasing the oxygen ($O_2$) content of the catalytically treated exhaust.

It is still another object of the present invention to provide an improved catalytic material which is highly resistant to poisoning from exhaust contaminants and has versatility in treating a wide diversity of combustion gas material generated from, for example, solid and liquid fossil fuels, other carbonaceous materials such as wood and garbage, as well as used tire rubber.

It is yet another object of the present invention to provide a catalytic material useful for scrubbing of steam well gases.

Towards achieving the above and other objects of the present invention, this invention provides for a novel catalytic material obtained from a volcanic ash material located in northern Nevada, Washoe County, near Pyramid Lake.

The inventive material comprises predominantly, i.e., greater than 50% by weight, plagioclase feldspar. Plagioclase is a general name for triclinic feldspars having anorthic or asymmetric crystal structure of three unequal long axes at oblique angles. Feldspar comprises the mineral $K_2O,Al_2O_3,6SiO_2$.

Moreover, the predominant mineral component, plagioclase feldspar, belongs to the albite-anorthite series; in other words, the feldspar material itself comprises albite and anorthite minerals. The albite ($NaAlSi_3O_8$) and anorthite ($CaAl_2Si_2O_8$) minerals are completely compatible and together form an isomorphous series ranging from the pure soda feldspar at the one end to the pure lime feldspar at the other end of the isomorphous series. There are isomorphous relations between these two molecules and substantial identity of crystal structure. For example, the sodium and calcium atoms, on one hand, and the silica and aluminum atoms, on the other, may replace each other in the structure.

Additionally, the inventive material contains minor amounts of other minerals, which, in sum, comprise less than 50% by weight of the total weight of the inventive material. Among the minerals which may constitute the "minor components" of the, material and which have been identified are mica—$KAl_2Si_3AlO_{10}(OH)_2$, kaolinite—$H_4Al_2Si_2O_9$ or $2H_2O.Al_2O_3.2Si_2$ and serpentine—$H_4MgSi_2O_9$ or $3MgO.2SiO_2.2H_2O$. These minerals are considered to constitute the bulk of the minor components, but the material obviously may contain a variety of other impurities, i.e., small amounts of other minerals and trace amounts of various metals and other elements. In its native state, the material also contains magnetite ($FeO.Fe_2O_3$).

While it has been discovered that the inventive material of the present invention can exhibit the catalytic effect in its native state, it has further been discovered that the catalytic effect can be enhanced when the inventive material is subjected to a magnetic separation treatment to remove magnetite ($Fe_3O_4$ or $FeO.Fe_2O_3$).

The novel features which are considered as characteristic for the invention are set forth in particular in the appended claims. The invention itself, however, both as to its construction and its method of operation, together with additional objects and advantages thereof, will be better understood from the following description as specific embodiments when read in connection with accompanying drawings.

Also, while the precepts of the present invention are presented in the context of an emission control device inserted into the output of an exhaust manifold of an internal combustion engine, it is to be understood that the inventive material and principles of its use described herein are adaptable to many other types of combustion gas treatment units.

DESCRIPTION OF THE PREFERRED EMBODIMENTS

Figure 1:
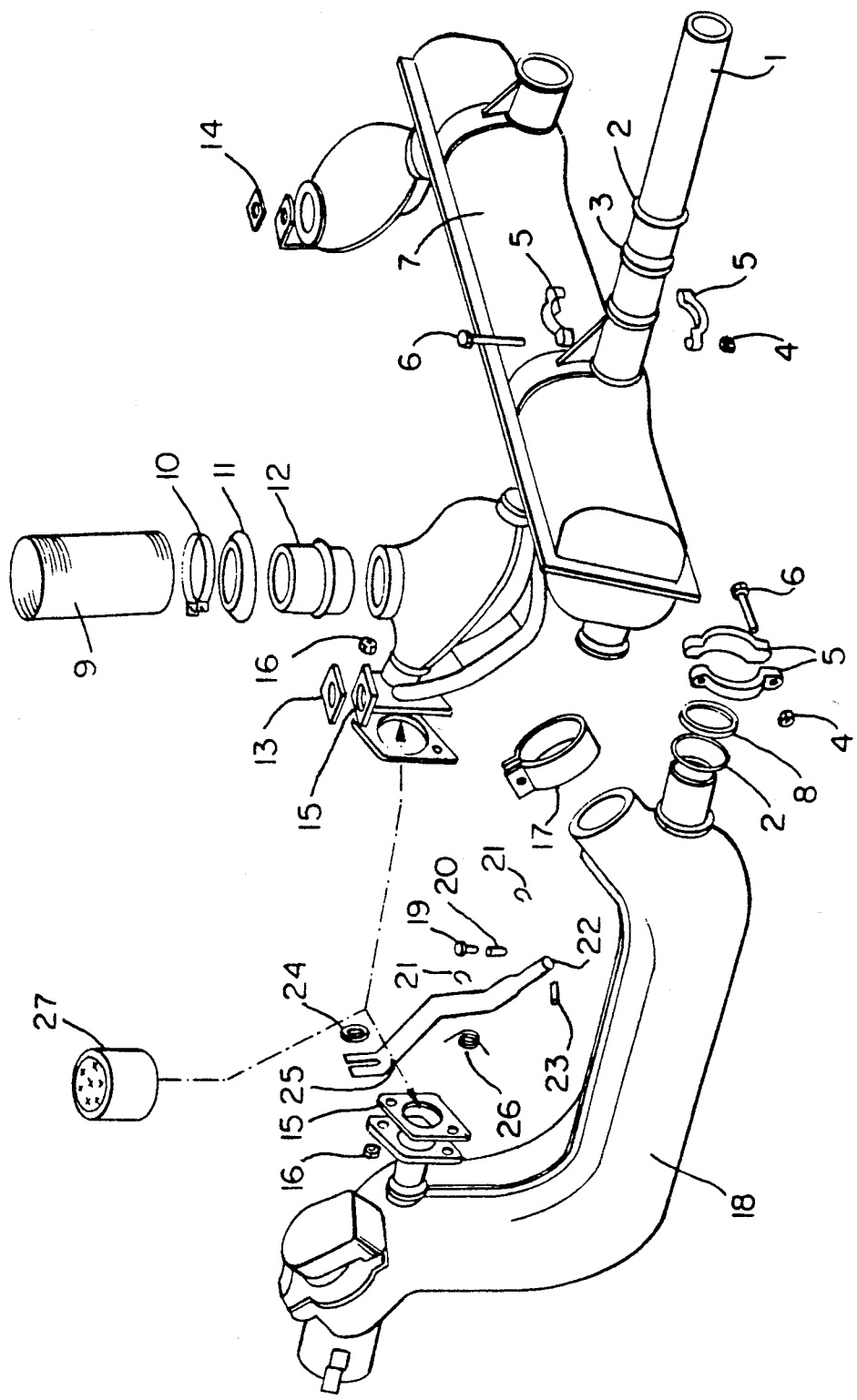
FIG. 1 represents a perspective view of an emission control device containing the catalytic material of the present invention when inserted into the output manifold of an internal combustion engine.

In the present invention, a catalytic material is used which is a volcanic ash obtained from an unusual mineral formation located in northern Nevada, Washoe County, near Pyramid Lake.

While the igneous raw mineral used in the present invention is available in different forms, two exemplary types of the material include the following: (1) a mineral substance which is light beige in color and resembles a sandstone type of material or texture, and (2) a mineral substance which is black in color and resembles a basalt type of material.

Based on expert interpretations of X-ray studies and other elemental analyses performed on the inventive material, both of the above-described strains of the inventive material are principally constituted by plagioclase feldspar and possess a complex morphology and esoteric composition.

The predominant mineral component, plagioclase feldspar, is considered to belong to the albite-anorthite series. The albite ($NaAlSi_3O_8$) and anorthite ($CaAl_2Si_2O_8$) minerals are completely compatible in terms of their crystal structure, and together form an isomorphous series ranging from the pure soda feldspar at the one end to the pure lime feldspar at the other end of the series. There are isomorphous relations between these two molecules and substantial identity of crystal structure. The sodium and calcium atoms, on one hand, and the silica and aluminum atoms, on the other, may replace each other in the structure.

Also, as noted above, other minerals may be present in the material in amounts of up to (in sum total) 50% by weight, including, but not necessarily limited to, minor amounts of mica—$KAl_2Si_3AlO_{10}(OH)_2$, kaolinite—$H_4Al_2Si_2O_9$ of $2H_2O.Al_2O_3.2Si_2$ and serpentine —$H_4MgSi_2O_9$ or $3MgO.2SiO_2.2H_2O$. However, as noted above, a variety of impurities (other minerals, trace amounts of metals and other elements) are also present, including magnetite.

ICP (Inductively Coupled Plasma) and AA (Atomic Absorption) analyses were performed on the inventive material under the following protocol. The inventive material, as obtained from the source location described herein, was ground and homogenized by means of a disk disintegrator in order to obtain fraction of less than 100 mesh. Certain samples from the ground material were subjected to magnetic separation (i.e., removal of magnetite) and then treatment at temperatures of 500° C. (932° F.) or 750° C. (1382° F.) for two hours. The testing samples were numbered as follows:

1. Original inventive material (clumps removed by mechanical grinding).
2. Inventive material after magnetic separation.

3. Magnetic fraction isolated from the original inventive material.
4. Inventive material after magnetic separation and after treatment at 500° C.
5. Inventive material after magnetic separation and treatment at 750° C.

Samples 1, 2, and 3 were then digested in acids using the following procedure:

1 gram of a sample was placed in teflon beaker and added 15 ml nitric acid ($HNO_3$), 10 ml percloric acid (HClO) and 2 ml hydrofluoric acid (HF). That beaker was covered with teflon lid and placed on a 250° F. hotplate for 1½ hours. Then the cover was removed and mixtures were evaporated at 300° F. for 4 hours. The residue in the beaker was cooled and added 5 ml $HNO_3$ and 20 ml distilled water. The mixture was boiled for 5 minutes and diluted to 50 ml in volumetric flask with distilled water. That solution was analyzed for metal (but not Si/silica content - see below) content by means of Inductively Coupled Plasma (ICP) using Perkin-Elmer Plasma II Emiston Spectrometer and by means of Atomic Absorption Spectrometer using Perkin-Elmer AAS-3100. The results from these analyses are shown in Table 1.

TABLE 1

| SAMPLE NUMBER | 'ICP' AND 'AA' ANALYSIS OF MATERIAL IN PPM | | | | | | | | | | |
|---|---|---|---|---|---|---|---|---|---|---|---|
| | Zn | Cd | Pb | Cu | Co | Ni | Fe | Mn | Y | Mg | Co |
| 1 | 60 | 10 | 30 | 10 | 0 | 0 | 21500 | 475 | 10 | 3715 | 14740 |
| 2 | 45 | 0 | 35 | 10 | 0 | 0 | 11000 | 340 | 10 | 3440 | 15565 |
| 3 | 840 | 40 | 80 | 40 | 45 | 0 | 507000 | 3875 | 20 | 375 | 11235 |
| | Mo | W | B | Ba | P | Nb | TT | As | Cr | Sb | Te |
| 1 | 0 | 10 | 40 | 1100 | 365 | 15 | 1325 | 10 | 0 | 10 | 15 |
| 2 | 0 | 0 | 35 | 1110 | 300 | 15 | 1325 | 10 | 0 | 0 | 20 |
| 3 | 0 | 20 | 35 | 210 | 3115 | 175 | 1300 | 40 | 30 | 50 | 105 |
| | Bi | Be | V | Zr | | | No | K | | | Al |
| 1 | 0 | 0 | 30 | 75 | | | 30300 | 26500 | | | 111740 |
| 2 | 0 | 0 | 10 | 75 | | | 30200 | 26100 | | | 105220 |
| 3 | 10 | 10 | 845 | 40 | | | 4010 | 2800 | | | 20460 |

To determine the $SiO_2$ content from samples 1, 2 and 3, the samples were also subjected to high pressure digestion in hydrofluoric acid in order to dissolve the materials. The samples were then analyzed as above, and $SiO_2$ content was found to be 66.3 wt% for sample 1, 67.1 wt% for sample 2, and 11.7 wt% for the magnetic fraction, sample 3. Overall, these elemental analyses of samples 1 and 2 confirm the mineral content of the material discussed above.

Also, after temperature treatment at 500° C. or 750° C. (samples 4 and 5), the inventive material was subjected to X-ray diffraction analysis. The results revealed a material comprising mainly plagioclase feldspar and traces of mica. Kaolinite and serpentine s were also believed to be present but did not appear on the charts since these compounds release their crystallization water when heated.

Also, ICP and DC plasma analyses on a sample of the inventive material further detected the presence of the following elements, beyond those already noted in Table 1 above, in trace amounts in the material (on the order of 0.5 ppm to 0.02% by weight for each element): Silver, molybdenum, nickel, tin, lithium, gallium, lanthanum, tantalum, strontium, zirconium, and sulfur. In addition, the presence of the following oxides was confirmed: silica ($SiO_2$), titanium dioxide ($TiO_2$), alumina ($Al_2O_3$), iron oxide as $Fe_2O_3$ (magnetite), manganese oxide (MnO), magnesium oxide (MgO), calcium oxide (CaO), sodium oxide ($Na_2O$), potassium oxide ($K_2O$), and phosphorous oxide ($P_2O_5$).

Another aspect of the present invention is the discovery that the inventive material can be used as a catalyst in at least two different states. For instance, the inventive material can be used in its native state or, alternatively, the inventive material can be subjected to conventional foundry furnace processing at approximately 2500° F. to form a solid metal alloy variation of the inventive material.

In either variation, the inventive material can be subjected to magnetic separation treatment to remove magnetite, in the main, before use of the material as a catalyst in its native state or after the foundry treatment. The magnetic separation treatment can be performed with a conventional ferromagnetic device or a conventional electromagnetic device.

Therefore, while the invention is illustrated in greater detail herein with exemplary usage of the inventive material in its native state (preferably after agglomerated clumps are mechanically eliminated), it is understood that the present invention also encompasses the usage of the solid metal alloy version of the inventive material.

As another important aspect of the present invention, it has been determined that the inventive material of the present invention exhibits its unexpected catalytic effect after being activated by heating to and maintaining a temperature of approximately 850° F. or higher. However, this activation can be accomplished in-situ (in the automobile exhaust system) if the activating temperature of approximately 850° F. or higher is experienced by the emission control device as installed in the hot exhaust system.

On the other hand, if the exhaust system does not operate continually at the activating temperature, then external heating sources, described in greater detail hereinafter, may be used to provide the supplemental heating needed for activating the inventive material in the installed emission control device.

Unlike conventional honeycomb systems with platinum or palladium, the mineralsubstance of the present invention will not clog up a honeycomb surface so as to necessitate replacements of the converter after a given period of usage.

Also, and significantly, the inventive material or alloy substance of the present invention does not become deactivated or poisoned due to exposure to exhaust contaminates such as lead Therefore, the inventive material of the present invention is particularly useful for catalytic treatment of combusted leaded gasoline.

Moreover, the nature of the inventive compound or alloy compound of the present invention allows for applications to be cast, shaped, and/or fabricated into any desired configuration commensurate with the specific usage, such as car exhaust manifolds, and coal burning smokestacks and stoves requiring customized designs of the emission control device.

Additionally, it has been determined that the catalytic effect of the inventive material of the present invention is demonstrated in its native state, but this catalytic effect also can be significantly enhanced after subjecting the original inventive material to a magnetic separation treatment. During the magnetic separation, the black fraction of the material is taken out which mainly comprises magnetite ($Fe_3O_4$ or $FeO.Fe_2O_3$). The magnetic fraction may also contain hydroxylapatite—$Ca_5(PO_4)_3OH$.

When heated to 220° C. in oxygen, the inventive material remaining after magnetical separation changes in color to red $Fe_2O_3$ without, however, any noticeable change in magnetism or the X-ray structure pattern, but when heated further to 550° C., all magnetism disappears. This loss of magnetism is believed to be associated with the color change observed in the material during heating at the higher operating temperatures of 850° F. or higher.

While the inventive material of the present invention has many and diverse possible applications, as suggested above, the use of the inventive material in an emission control device inserted in an exhaust manifold output of an internal combustion engine is described in detail below for illustration purposes.

It has been discovered that an emission control device containing the inventive material of the present invention, when inserted into the exhaust system of a gasoline engine, will reduce the harmful emissions of hydrocarbons, carbon monoxide and carbon dioxide by as much as 72% of the original content. Moreover, a reduction in the NO emissions is observed concomitant with an increase in the emission of oxygen ($O_2$).

An illustrative depiction of the emission control device, as to be installed, is provided in FIG. 1. The elements depicted in FIG. 1 are described below by reference to their assigned reference numerals.

1—tail pipe
2—Retaining ring
3—Seal
4—Self-locking nut
5—Clamp
6—Clamp belt
7—Silencer
8—Seal
9—Air inlet hose
10—Hose clip
11—Grommet
12—Connecting pipe
13—Gasket-pre-heater pipe (left)
14—Gasket-pre-heater pipe (right)
15—Gasket-exhaust pipe flange
16—Self-locking nut
17—Clamp
18—Heat exchanger
19—Bolt
20—Pin
21—Circlip
22—Heater cable link
23—Pin
24—Clamp washer
25—Heater flap lever (left)
26—Lever return spring (left)
27—Emission Control Device (E.C.D.)

The E.C.D. insert device 27 can be installed without the need for modification of the existing engine exhaust system. However, atmospheric air must be prevented from entering the manifold before the emission control device (E.C.D.). All connections must be sealed.

In order to achieve satisfactory operating efficiency of the E.C.D., the optimum exhaust gas temperature is 850° F. or above. The temperature is measured at the base of the E.C.D. In cold engine starting, and in some engines when idling, the exhaust gas temperature is below 850° F., so when this occurs, an external thermostat-controlled preheater device (not depicted) is attached to the E.C.D. For instance, a heating wire (not depicted) is connected between the E.C.D. and a remote thermostat. The heating wire is preferably coated with inventive material using the same type of paste employed in the E.C.D. and described hereinafter.

When using the preheater device, the E.C.D. begins to function within one minute of a cold engine start. When the engine exhaust gas temperature rises to 850° F. the thermostat automatically turns off the preheater and remains off unless the temperature falls below 850° F. The preheater can be powered by the existing vehicle battery and produces an amperage load approximately equal to a factory installed cigarette lighter. Activation of the preheater can be accomplished through the accessory section of the ignition switch, so there is no battery current drain until the engine is started.

In the event E.P.A. regulations change to include cold engine starting, the E.C.D. can simply be controlled in a similar manner as adapted from known diesel engine preheaters for cold starting in current use.

As depicted in FIG. 1, the E.C.D. 27 is tubular in construction or, alternatively, of strip construction, and is mounted in a standard exhaust manifold to tail pipe flange. The tube section O.D. is determined by the I.D. of the exhaust manifold opening. Since the manifold port inside diameter is greater than the exhaust tail pipe I.D., the device may be inserted into the manifold without creating exhaust back pressure.

The tube portion of the E.C.D. may be steel or steel alloy or a ceramic. The tube is attached to a standard exhaust pipe flange that bolts directly to the manifold. When the device is installed, the tube portion inserts into the manifold and the flange is sandwiched between the manifold and the exhaust tail pipe flange. The preheater electrical conductor protrudes through, but is insulated from the flange, and connects directly to the thermostat.

Since the tube acts only as a carrier for the reactive coating, the composition of the tube carrier need only be selected with the constraint that it is able to withstand the high temperature of the exhaust gas and the operating temperature of the E.C.D. In this regard, high temperature ceramic tubes are useful.

The active ingredient of the E.C.D. is a coating containing the inventive material as applied to the tube surface portions, both inside and outside, and also onto the preheater wire, if needed.

In order to provide this coating, the inventive material described above is first dry pulverized to powder size of no less than 40 mesh but sufficient to eliminate clumps. Then the inventive mineral material is applied to the surface of the E.C.D. tube in a dispersed state in a high temperature ceramic paste, then cured in an oven at elevated temperature. A representative ceramic paste is Zirconia Ultra Hi-Temp Ceramic supplied by Co-Tronics Corp. This paste can withstand heat of up to 4000° F.

Installation of the Emission Control Device can be accomplished by the procedure of placing the vehicle on a hoist, removing the manifold-to-tail pipe bolts, lowering of the pipe approximately three inches. Then, tube portion of the E.C.D. is inserted into the exhaust manifold, then the flange is aligned with the manifold bolt, and then the tail pipe is replaced and the manifold bolt tightened.

On 2-4 & 6 cylinder engines having one exhaust manifold, one E.C.D. typically is used. On a V6 and V8 engines, the E.C.D. is inserted in each manifold.

The basic shape of the device is maintained for all engines, but the size is determined by the cubic inch displacement of the engine. Approximately five flanges and tube sizes will fit U.S. vehicles and some foreign vehicles. The emission control device of the present invention can be used alone as a catalytic converter for the exhaust system of a gasoline engine or, more desirably, can be used to augment existing exhaust systems.

When installed in older vehicles and any four cycle gasoline engines, the emission control device of the present invention acts a catalytic converter transforming the engine into a clean emission engine which meets current state emission standards. Also, while automotive manufacturers have different exhaust configurations, the emission control device of the present invention can be adapted to physically fit the different engine exhaust pipes in ready fashion. Nonetheless, the operating efficiency of the emission control device of the present invention remains the same.

As can be appreciated from the descriptions provided herein, the catalytic device and inventive material of the present invention provides an improved catalytic material which is highly resistant to poisoning from exhaust contaminants and has versatility in treating a wide diversity of combustion gas material generated from, for example, solid (e.g. coal) and liquid fossil fuels, other carbonaceous materials such as wood and garbage, as well as used tire rubber.

While the invention has been described in detail and with reference to a specific embodiment thereof, it will be apparent to one skilled in the art that various changes and modifications can be made therein without departing from the spirit and scope thereof.

What is claimed is:

1. An emission control device comprising a substrate supporting a, catalytic material comprising plagioclase feldspar in an amount greater than 50 wt%, said feldspar mainly comprising albite and anorthite minerals, and said material containing magnetite.

2. The emission control device as claimed in claim 1, wherein said material further comprises a minor proportion of mica, kaolinite and serpentine in a total amount of less than 50 wt%.

3. The emission control device as claimed in claim 1, wherein said substrate carries the catalytic material in the form of a cured ceramic adhesive having the material uniformly dispersed therein, said adhesive capable of withstanding temperatures of 850° F. or higher.

4. An emission control device comprising a substrate supporting a catalytic material comprising plagioclase feldspar in an amount greater than 50 wt%, said feldspar mainly comprising albite and anorthite minerals, from which magnetite has been removed.

5. The emission control device as claimed in claim 4, wherein said material further comprises a minor proportion of mica, kaolinite and serpentine in a total amount of less than 50 wt%.

6. The emission control device as claimed in claim 4, wherein said substrate carries the catalytic material in the form of a cured ceramic adhesive having the material uniformly dispersed therein, said adhesive capable of withstanding temperatures of 850° F. or higher.

7. A catalytic material comprising plagioclase feldspar in an amount greater than 50 wt%, said feldspar mainly comprising albeit and anorthite minerals, from which magnetite has been removed.

8. A catalytic material as claimed in claim 7, further comprising a minor proportion of mica, kaolinite and serpentine in a total-amount of less than 50 wt%.

* * * * *